(12) United States Patent
Kino et al.

(10) Patent No.: US 7,322,381 B2
(45) Date of Patent: Jan. 29, 2008

(54) INTAKE DUCT

(75) Inventors: Hitoshi Kino, Aichi (JP); Hiroshi Iwao, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/524,189

(22) Filed: Sep. 21, 2006

(65) Prior Publication Data

US 2007/0068589 A1    Mar. 29, 2007

(30) Foreign Application Priority Data

Sep. 26, 2005    (JP) .............................. 2005-278614

(51) Int. Cl.
*F16L 9/00*    (2006.01)

(52) U.S. Cl. ...................... 138/157; 138/156; 138/162; 138/163; 123/184.21

(58) Field of Classification Search ................ 138/156, 138/157, 162, 163; 123/184.21, 184.61
See application file for complete search history.

(56) References Cited

U.S. PATENT DOCUMENTS

| 265,716 A | * | 10/1882 | Taylor | ........................ 138/163 |
| 2,867,681 A | * | 1/1959 | Huehnel | ...................... 174/101 |
| 3,126,444 A | * | 3/1964 | Taylor | ........................ 174/101 |
| 5,061,121 A | * | 10/1991 | Matiere | ....................... 405/155 |
| 5,904,185 A | * | 5/1999 | Matiere | ....................... 138/157 |
| 2004/0187826 A1 | * | 9/2004 | Kino et al. | ............. 123/184.21 |

FOREIGN PATENT DOCUMENTS

JP     A-2002-106431     4/2002

* cited by examiner

*Primary Examiner*—Patrick F. Brinson
(74) *Attorney, Agent, or Firm*—Posz Law Group, PLC

(57) ABSTRACT

A duct main body is formed into a hollow tubular shape having in an interior thereof an intake passageway for introducing outside air into an internal combustion engine by connecting integrally a plurality of divided bodies such as a first divided body and a second divided body which are formed of a thermoplastic resin and has in a duct wall of the second divided body an opening which establishes a communication between the inside and outside of the intake passageway. An air-permeable member is insert molded in the second divided body in such a manner as to cover the opening. The air-permeable member has on an outer edge thereof a joining portion which is impregnated with the thermoplastic resin. The second divided body has in at least part of an inner peripheral edge of the opening a vertical wall portion which protrudes outwards from the duct wall of the second divided body along an inner edge of the opening, and at least part of the joining portion of the air-permeable member is embedded in the vertical wall portion in such a manner as to be held therein in a thickness direction.

9 Claims, 8 Drawing Sheets

INTAKE DUCT

BACKGROUND OF THE INVENTION

1. Field of the Invention

The present invention relates to an intake duct for introducing outside air into an internal combustion engine and more particularly to an intake duct which can reduce intake noise.

2. Related Art

In an intake system of an automotive engine, there exists a problem that intake noise is generated from an intake duct when outside air is introduced therethrough into the engine. This intake noise becomes noticeable in particular when the engine speed is low.

Then, as an intake duct which can reduce intake noise, there is known an intake duct in which an opening is provided in a duct wall of the intake duct in such a manner as to establish a communication between the inside and outside of an intake passageway, and an air-permeable member is provided in such manner as to close the opening so provided (for example, refer to JP-A-2002-106431.).

As is shown in FIG. 15, this intake duct includes a duct main body 82 which is formed into a hollow tubular shape having in an interior thereof an intake passageway 80 for introducing outside air into an internal combustion engine and which has in a duct wall an opening 81 which establishes a communication between the inside and outside of the intake passageway 80 and a porous sheet 83 as an air-permeable member which is provided in such a manner as to close the opening 81. The duct main body 82 is such that two divided bodies 84 which are formed of a thermoplastic resin are connected together, and the porous sheet 83 is insert molded in the divided body 84.

In this insert molding, molten thermoplastic resin is injected into a cavity in such a state that the porous sheet 83 is disposed within a predetermined mold, so that an outer edge of the porous sheet 83 is impregnated with the molten resin so injected. Then, the molten resin is cooled to set in such a state that the resin that has intruded into interstices of fibers which make up the porous sheet 83 and the fibers get entwined in each other, so as to form a joining portion 83a where the outer edge of the porous sheet 83 is impregnated with the resin, whereby the porous sheet 83 is joined to the divided body 84.

According to the intake duct in which the opening 81 formed in the duct wall is covered by the porous sheet 83 in this way, the generation of standing wave is suppressed, for example, due to part of acoustic wave generated within the intake passageway 80 passing through the porous sheet 83, whereby intake noise can be reduced.

In the conventional intake duct that has been described above, however, the porous sheet 83 having substantially the same thickness as that of the divided body 84 is joined to the divided body 84 which make up the duct main body 82 in such a state that facing sides of the porous sheet 83 and the divided body 84 butt at each other (in such a state that an outer peripheral surface of the porous sheet 83 and an inner peripheral surface of the divided body 84 which defines the opening 81 butt at each other). Due to this, the joining strength of the porous sheet 83 relative to the divided body 84 becomes deficient, and hence, there has been a risk of a drawback occurring that an outer edge of the porous sheet, for example, is turned up outwards.

SUMMARY OF THE INVENTION

The invention was made in view of the situations, and a technical subject that the invention is to solve is to provide an intake duct which manages to increase the joining strength of an air-permeable member relative to a duct main body.

With a view to solving the problem, according to a first aspect of the invention, there is provided an intake duct comprising:

a duct main body formed into a hollow tubular shape having an intake passageway in an interior thereof through which outside air is introduced into an internal combustion engine, the duct main body including a plurality of divided bodies made of a thermoplastic resin connected integrally with one another to form an opening for a communication between an inside and outside of the intake passageway in a duct wall of the divided body; and an air-permeable member which is provided by insert molding in the divided bodies so as to cover the opening and whose outer edge as a joining portion is impregnated with the thermoplastic resin, wherein the divided bodies have a vertical wall portion which protrudes outwards from a duct wall of the divided bodies along at least a part of an inner edge of the opening, and at least a part of the joining portion of the air-permeable member is embedded in the vertical wall portion so as to be held therein in a thickness direction thereof.

The air-permeable member which covers the opening in the divided body is insert molded in this intake duct, and the outer edge of the air-permeable member is impregnated with the thermoplastic resin which makes up the divided body, so as to form the joining portion. Namely, by the insert molding in which the thermoplastic resin which is in a molten state is injected into a cavity in such a state that the air-permeable member is disposed within a predetermined mold, the thermoplastic resin penetrates into the outer edge of the air-permeable member to thereby intrude into interstices of fibers which make up the air-permeable member and is then cooled to set in such a state that the resin and the fibers get entwined with each other in a complex fashion, so as to form the joining portion.

In addition, in this intake duct, the divided body has in at least part of the inner peripheral edge of the opening the vertical wall portion which protrudes outwards from the duct wall of the divided body along the inner edge of the opening, and at least part of the joining portion of the air-permeable member is embedded in the vertical wall portion in such a manner as to be held therein in the thickness direction thereof. Due to this, when insert molding, the thermoplastic resin which flows into a portion of the cavity which corresponds to the vertical wall portion comes to penetrate into the outer edge of the air-permeable member from three directions; from both sides in a thickness direction and an edgewise face of the air-permeable member. Due to this, the impregnation amount of the resin can be increased by securely making the vertical wall portion extend long enough relative to the thickness of the air-permeable member, whereby the resin and the fibers in the joining portion are allowed to get entwined with each other in a more ensured fashion. In addition, since the joining portion of the air-permeable member is embedded in the vertical wall portion in such a manner as to be held therein in the thickness direction, the joining portion and the vertical wall portion is joined to each other by a mechanical connecting force. Consequently, the joining strength between the divided body and the air-permeable member can be increased in an ensured fashion.

In addition, the drawback that the outer edge of the air-permeable member is turned up can be prevented effectively in the portion where the joining portion of the air-permeable member is embedded in the vertical wall portion.

According to a second aspect of the invention, there is provided an intake duct according to the first aspect of the invention, wherein the opening and the air-permeable member are each formed into a substantially rectangular shape which is elongated in a direction in which the intake passageway extends, and wherein the vertical wall portion is formed in a pair of long side portions of the opening in such a manner as to extend in a longitudinal direction, and the joining portion in a pair of long side portions of the air-permeable member is embedded in facing inner surfaces of the pair of vertical walls so formed.

In this intake duct, the vertical wall portion is formed in pair in the long side portions of the opening which is formed into the rectangular shape, and the joining portion of the air-permeable member is embedded in the facing inner surfaces of the vertical wall portions formed in pair. Due to this, in the opening and the air-permeable member, the joining of the vertical wall portions to the joining portion can be secured over a long range of the long side portions. Consequently, the invention is advantageous in increasing the joining strength between the divided body and the air-permeable member.

According to a third aspect of the invention, there is provided an intake duct according to the first or second aspect of the invention, wherein the opening and the air-permeable member are each formed into a substantially rectangular shape which is elongated in a direction in which the intake passageway extends, wherein the divided body has in a pair of short side portions of the opening a pair of covering projections which extends in a transverse direction along the inner edge of the opening and covers an outer surface of the joining portion in a pair of short side portions of the air-permeable member, and wherein an inner surface of the joining portion in the short side portions of the air-permeable member is made substantially level with an inner wall surface of the divided body.

In this intake duct, the drawback that the outer edge of the air-permeable member is turned up can be prevented effectively in the short side portions of the substantially rectangular shape. In addition, since the inner surface of the joining portion in the short side portions of the air-permeable member is made substantially level with the inner wall surface of the divided body, the invention is advantageous in causing air to flow smoothly within the intake passageway, thereby making it possible to suppress an increase in intake pressure loss which is attributed to the provision of the air-permeable member.

According to a fourth aspect of the invention, there is provided an intake duct according to the first aspect of the invention, wherein the vertical wall portion is a frame-like vertical wall portion which extends along the inner edge of the opening over the whole of the inner peripheral edge of the opening, and a whole periphery of the joining portion of the air-permeable member is embedded in the frame-like vertical wall portion.

In this intake duct, since the joining portion is embedded in the frame-like vertical wall portion along the whole of the outer peripheral edge of the air-permeable member, the joining strength of the air-permeable member relative to the divided body can be increased further.

According to the intake duct of the invention, irrespective of the thickness of the divided body and the air-permeable member, the joining properties of the joining portion can be improved, and the joining properties of the air-permeable member relative to the second divided member can be made highly reliable.

DETAILED DESCRIPTION OF THE PREFERRED EMBODIMENTS

Hereinafter, embodiments of intake ducts of the invention will be described by reference to the accompanying drawings.

Embodiment 1

Figure 1:
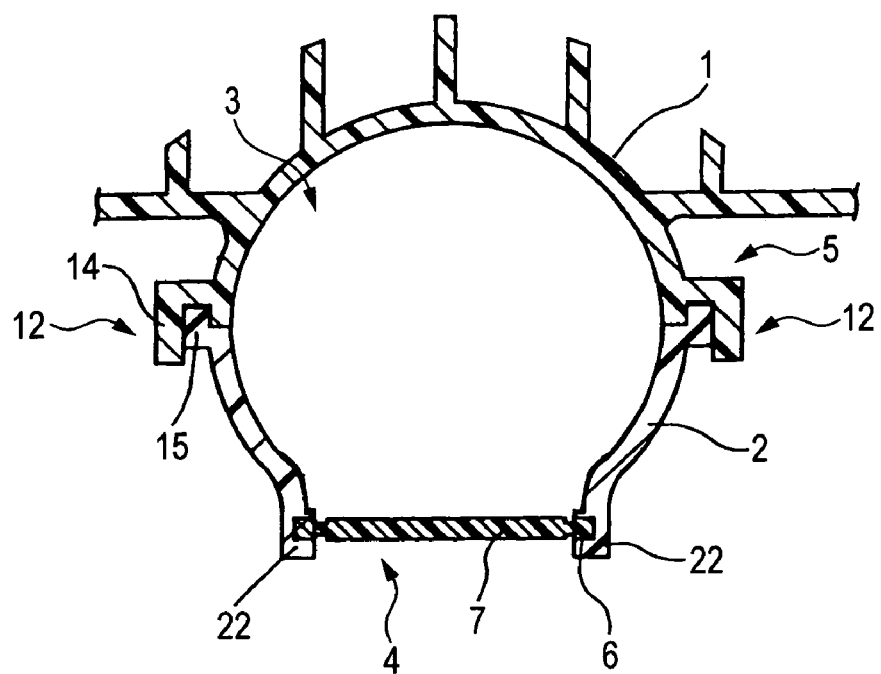
FIG. 1 is a sectional view taken along the line B-B in FIG. 6 which shows an opening and a portion where an air-permeable member is placed of an intake duct according to Embodiment 1.
Figure 2:
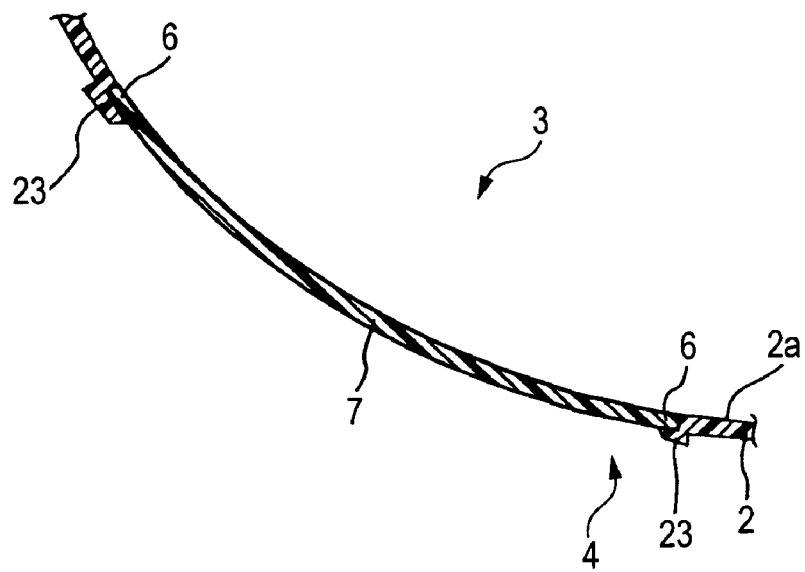
FIG. 2 is a sectional view taken along the line A-A in FIG. 5 which shows the opening and the portion where the air-permeable member is placed of the intake duct according to Embodiment 1.
Figure 3:
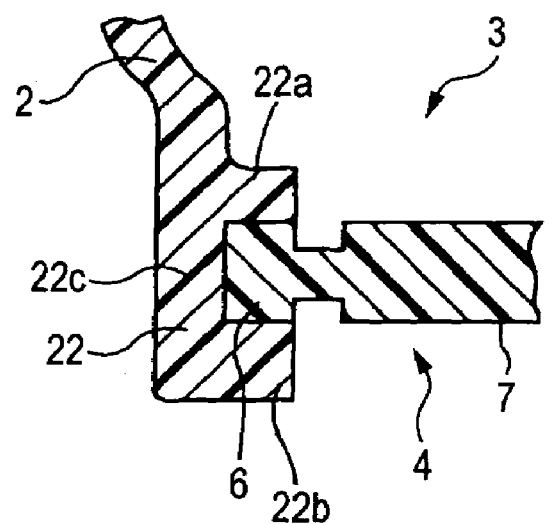
FIG. 3 is a partial sectional view taken along the line B-B in FIG. 6 which shows a main part of the intake duct according to Embodiment 1 in an enlarged fashion.
Figure 4:
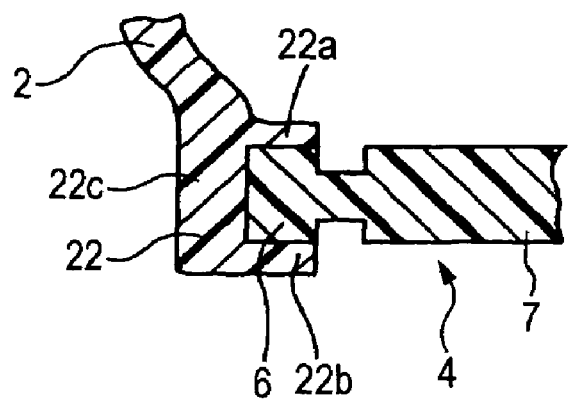
FIG. 4 is a partial sectional view taken along the line C-C in FIG. 6 which shows the main part of the intake duct according to Embodiment 1 in an enlarged fashion.
Figure 5:
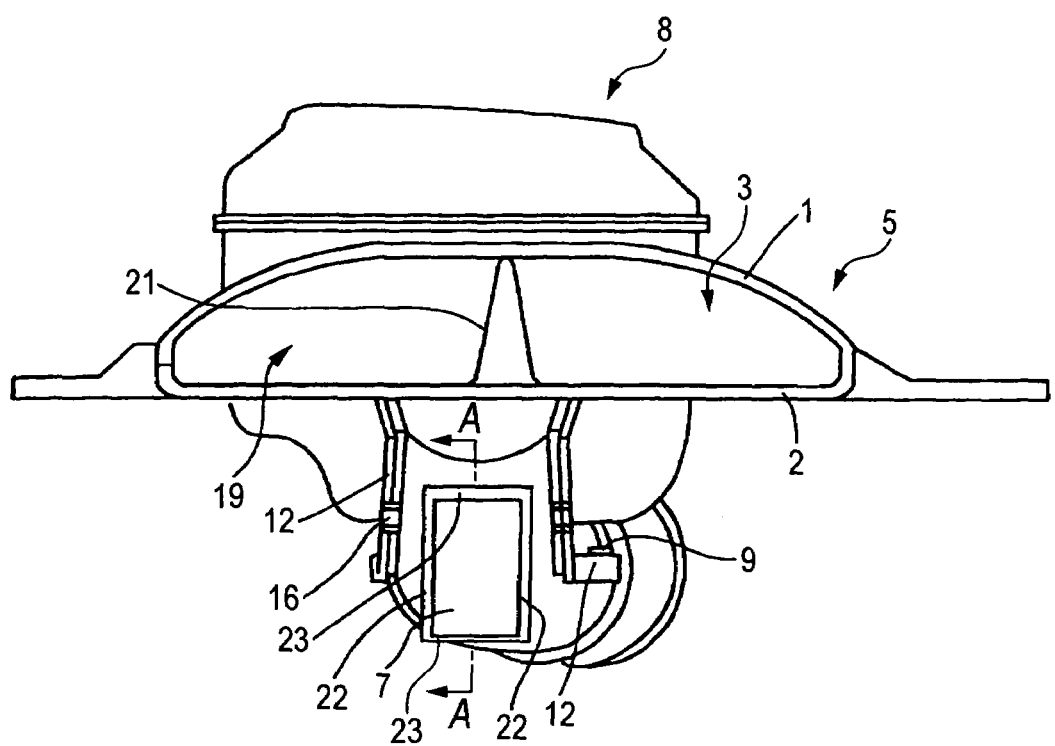
FIG. 5 is a front view which results when the intake duct according to Embodiment 1 is seen from the side of an inlet port.
Figure 6:
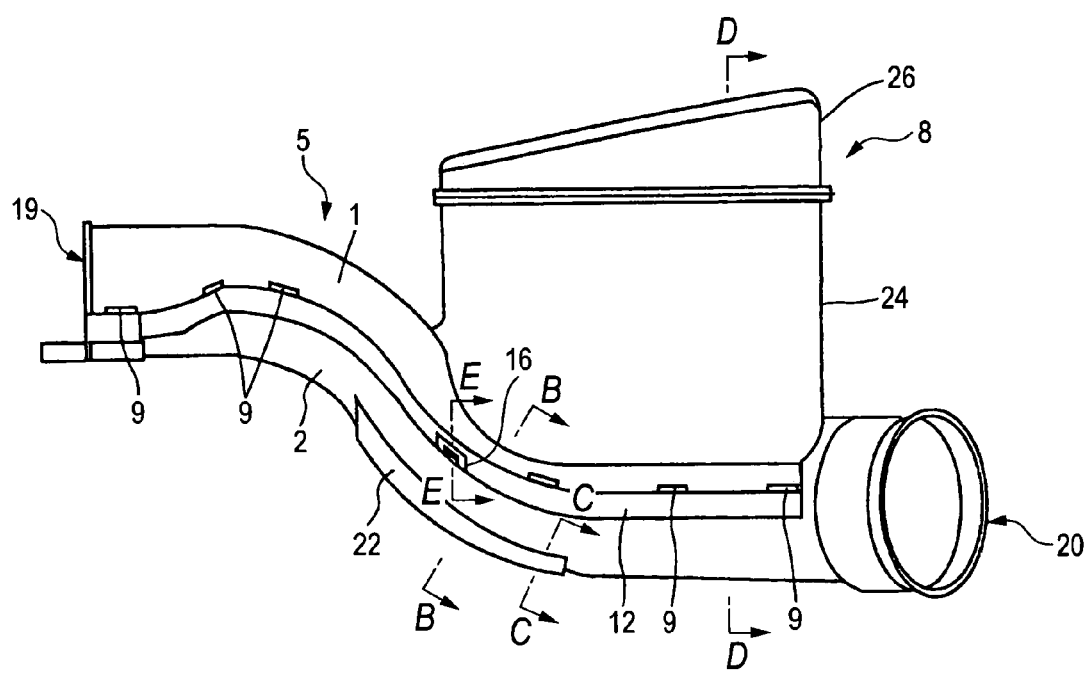
FIG. 6 is a side view of the intake duct according to Embodiment 1.
Figure 7:
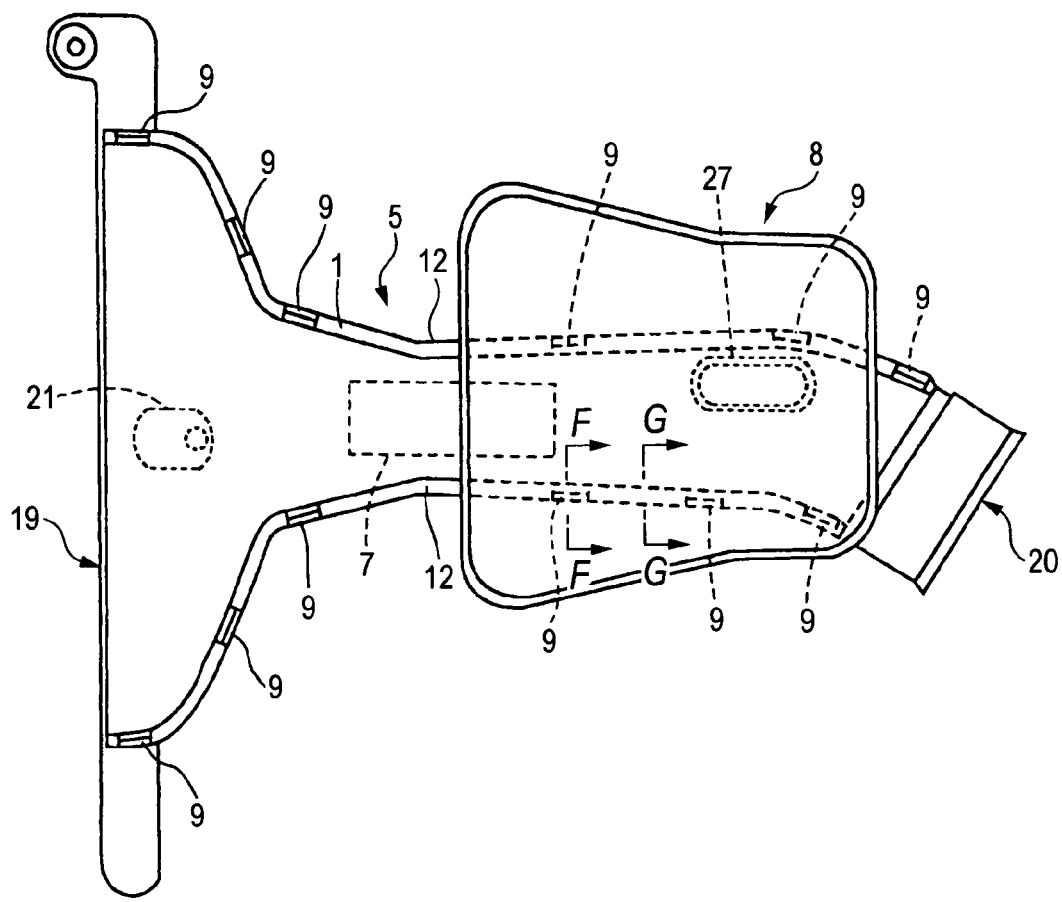
FIG. 7 is a plan view of the intake duct according to Embodiment 1.
Figure 8:
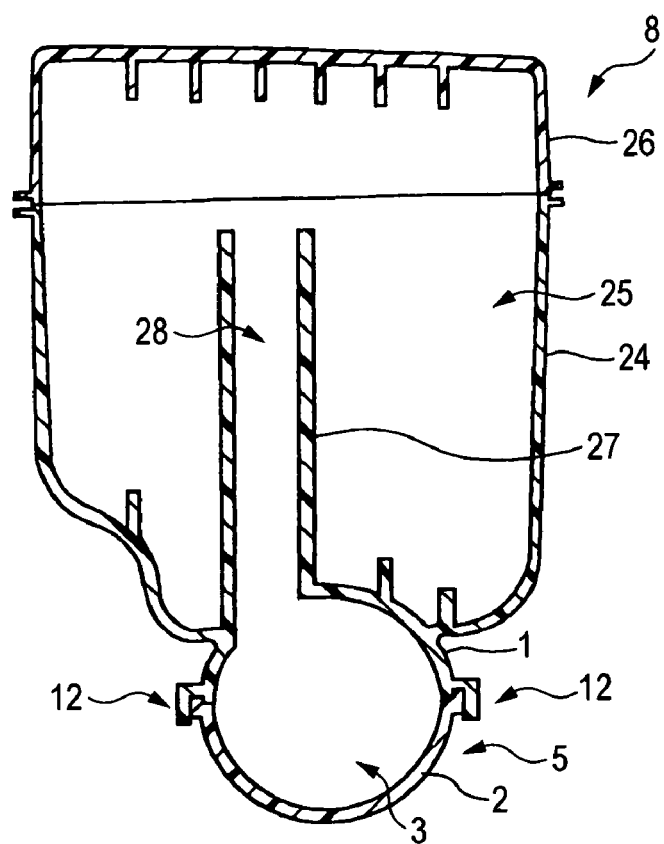
FIG. 8 is a sectional view taken along the line D-D in FIG. 6 which shows mainly a resonator of the intake duct according to Embodiment 1.
Figure 9:
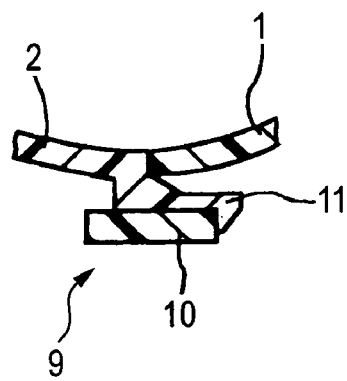
FIG. 9 is a sectional view taken along the line F-F in FIG. 7 which shows a connecting construction of divided bodies of the intake duct according to Embodiment 1.
Figure 10:
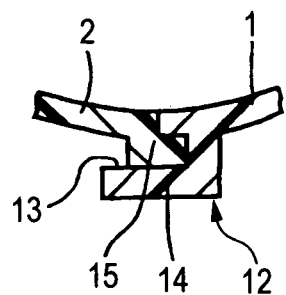
FIG. 10 is a sectional view taken along the line G-G in FIG. 7 which shows a sealing construction of the divided bodies of the intake duct according to Embodiment 1.
Figure 11:
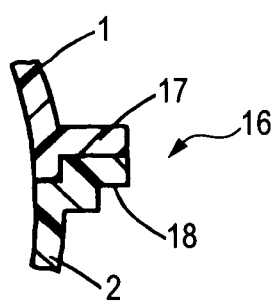
FIG. 11 is a sectional view taken along the line F-F in FIG. 6 which shows a positioning construction of the divided bodies of the intake duct according to Embodiment 1.

FIG. 1 is a sectional view taken along the line B-B in FIG. 6 which shows an opening and a portion where an air-permeable member is placed of an intake duct of this embodiment. FIG. 2 is a sectional view taken along the line A-A in FIG. 5 which shows the opening and the portion where the air-permeable member is placed of the intake duct. FIG. 3 is a partial sectional view taken along the line B-B in FIG. 6 which shows a main part of the intake duct in an enlarged fashion. FIG. 4 is a partial sectional view taken along the line C-C in FIG. 6 which shows the main part of the intake duct in an enlarged fashion. FIG. 5 is a front view which results when the intake duct is seen from the side of an inlet port thereof. FIG. 6 is a side view of the intake duct. FIG. 7 is a plan view of the intake duct. FIG. 8 is a sectional view taken along the line D-D in FIG. 8 which shows mainly a resonator of the intake duct. FIG. 9 is a sectional view taken along the line F-F in FIG. 7 which shows a connecting construction of divided bodies of the intake duct. FIG. 10 is a sectional view taken along the line G-G in FIG. 7 which shows a sealing construction of the divided bodies of the intake duct. FIG. 11 is a sectional view taken along the line F-F in FIG. 6 which shows a positioning construction of the divided bodies of the intake duct.

An intake duct of this embodiment includes a duct main body 5 which is formed into a hollow tubular shape having in an interior thereof an intake passageway 3 for introducing outside air into an internal combustion engine by integrally connecting a first divided body 1 and a second divided body 2 which are formed of polypropylene (PP) as a thermoplastic resin and which has an opening 4 which establishes a communication between the inside and outside of the intake passageway 3 in a duct wall of the second divided body 2, an air-permeable member 7 which is insert molded in the second divided body 2 in such a manner as to cover the opening 4 and which has a joining portion (refer to FIG. 3) which is impregnated with the thermoplastic resin along an outer edge thereof, and a resonator 8 which is provided integrally on the first divided body 1.

The first divided body 1 and the second divided body 2 are detachably connected together by a plurality of fitting portions 9. The fitting portion 9 is, as shown in FIG. 9, made up of a fitting frame 10 which is provided integrally on an edge portion of the first divided body 1 and a fitting claw which is provided integrally on an edge portion of the second divided body 2 in such a manner as to be fitted in and dislodged from the fitting frame 10.

In addition, the first divided body 1 and the second divided body 2 are securely sealed together along the edge portions thereof by seal portions 12 having a so-called labyrinth seal construction which extends longitudinally along the full length of the intake passageway 3. As is shown in FIG. 10, the seal portion 12 is provided integrally on the first divided body 1 in the vicinity of the edge portion thereof and is made up of an L-shaped engagement portion 14 which protrudes from an outer surface of the first divided body 1 in an L-shaped fashion as viewed in cross section so as to form an engagement recess portion 13 and an engagement portion 15 which is provided on the edge portion of the second divided body 2 in such a manner as to be brought into engagement with the engagement recess portion 13.

Furthermore, the first divided body 1 and the second divided body 2 are controlled with respect to their positions by a positioning portion 16 (refer to FIG. 6) which is designed to increase the working efficiency in connecting together the first and second bodies and to prevent the deviation in position of the first and second divided bodies. As shown in FIG. 11, the positioning portion 16 is made up of a first projecting piece 17 which is provided integrally on the first divided body 1 in the vicinity of the edge portion thereof so as to form a first engagement stepped portion and a second projecting piece 18 which is provided integrally on the edge portion of the second divided body 2 in such a manner as to be brought into engagement with the first engagement stepped portion.

Thus, the first divided body 1 and the second divided body 2 are securely connected together by the plurality of fitting portions 9 in such a state that the first and second divided bodies are controlled with respect to their positions by the positioning portions 16 and are securely sealed along the full length of the intake passageway 3 by the seal portions 12. In addition, the duct main body 5, which is made up of the first divided body 1 and the second divided body 2 which are connected integrally to each other, has an inlet port 19 at one end and an outlet port 20 at the other end thereof. In addition, this duct main body 5 has an a strut portion 21 which increases the rigidity on the inlet port 19 end in the vicinity of the inlet port 19. The strut portion 21 is provided in such a manner as to integrally erect from the second divided body 2. The collapse of the duct main body 5 in the vicinity of the inlet port 19 under a predetermined load or less is prevented by virtue of the abutment of a distal end of the strut portion 21 with the first divided body 1.

Additionally, in the intake duct 5 according to the embodiment, as has been described above, the opening 4 is formed in a predetermined position on the duct wall of the second divided body 2 in such a manner as to establish a communication between the inside and outside of the passageway 3, and being insert molded in the second divided body 2, the air-permeable member 7 is joined integrally to the second divided body 2 in such a manner as to cover the opening 4. This opening 4 is formed into a rectangular shape which is elongated in a direction in which the intake passageway 3 extends.

The second divided body 2 has in part of the inner peripheral edge of the opening 4 (a pair of long side portions of the opening 4) a pair of vertical wall portions (refer to FIGS. 1 and 5) 22 which extends along inner edges of the opening 4 in the longitudinal direction and protrudes outwards from the duct wall of the second divided body 2. This vertical wall portion 22 extends substantially at right angles to a duct axis of the intake duct 5. In addition, the vertical wall portion 22 has a maximum height (a length which extends substantially at right angles to the duct axis of the intake duct 5) at a longitudinally central portion, while the height of the vertical wall portion 22 is made to be reduced gradually as it extends towards longitudinal ends thereof (refer to FIGS. 3 and 4. Note that FIG. 3 is the sectional view taken along the line B-B in FIG. 6 which is drawn at a substantially central portion of the vertical wall portion 22 in the longitudinal direction thereof, and FIG. 4 is the sectional view taken along the line C-C in FIG. 6 which is drawn in the vicinity of an end portion of the vertical wall portion 22 in the longitudinal direction thereof). In addition, the joining portion 6 lying on a pair of long side portions of the air-permeable member 7 is embedded in facing inner surfaces of the pair of vertical wall portions 22 which extend along the pair of long side portions of the opening 4.

Namely, the vertical wall portion 22 has a ceiling portion 22a, a bottom wall portion 22b and a side wall portion 22c which are integrated therewith in such a manner that the ceiling portion 22a and the bottom wall portion 22b cover both sides of the joining portion 6 lying in the pair of long side portions of the air-permeable member 7 in such a manner as to hold the sides therebetween, the sides of the joining portion 6 so covered and held being oriented in a thickness direction thereof, while the side wall portion 22c covers an edgewise face of the joining portion 6 lying in the pair of long side portions of the air-permeable member 7. In addition, the ceiling portion 22a and the bottom wall portion 22b have their maximum thickness (a length which extends substantially at right angles to the duct axis of the intake duct 5) at the substantially longitudinally central portion of the vertical wall portion 22, and the thickness thereof is made to be reduced gradually as they extend towards longitudinal ends thereof.

In addition, the second divided body 2 has in the other part of the inner peripheral edge of the opening 4 (a pair of short side portions of the opening 4) a pair of covering projections (refer to FIGS. 2 and 5) 23 which extends along inner edges of the opening 4 in a transverse direction and projects from an outer surface of the second divided body 2 towards the inside of the opening 4 so as to cover an outer surface of the joining portion 6 lying in the short side portions of the air-permeable member 7.

Additionally, as shown in FIG. 2, an inner surface of the joining portion 6 lying in the short side portions of the air-permeable member 7 is made to be substantially level with an inner wall surface 2a of the second divided body 2 in the vicinity of a transversely central portion thereof.

The air-permeable member 7 is made of a nonwoven fabric of polyethylene terephthalate (PET). This air-permeable member 7 is formed by curving a rectangular plate-shaped material so that the air-permeable member 7 takes, in a longitudinal section, a shape (an arc-like shape) which curves in such a manner that a longitudinal central portion of the air-permeable member 7 protrudes outwards of the intake duct 5, while taking, in a transverse section, an arc-like shape, as well (refer to FIG. 2).

In addition, as has been described before, the resonator 8 is provided integrally on the first divided body. This resonator 8 has a first chamber wall portion 24 which is molded integrally with the first divided body 1 and a second chamber wall portion 26 which is joined integrally to the first chamber wall portion 24 through heat plate welding so as to form a box shape together with the first chamber wall portion 24 to thereby define a resonance silencer chamber 25 which lies adjacent to the intake passageway 3. In addition, this resonator 8 has a duct wall portion 27 which is molded integrally on the first divided body 1 on which the first chamber wall portion 24 is molded integrally. The duct wall portion 27 has a lower height than that of the first chamber portion 24 and defines a communication path 28 which establishes a communication between the intake passage way 3 and the silencer chamber 25 within the silencer chamber 25.

The intake duct according to the invention which has the configuration that has been described heretofore was fabricated by a fabrication method which will be described below.

Figure 12:
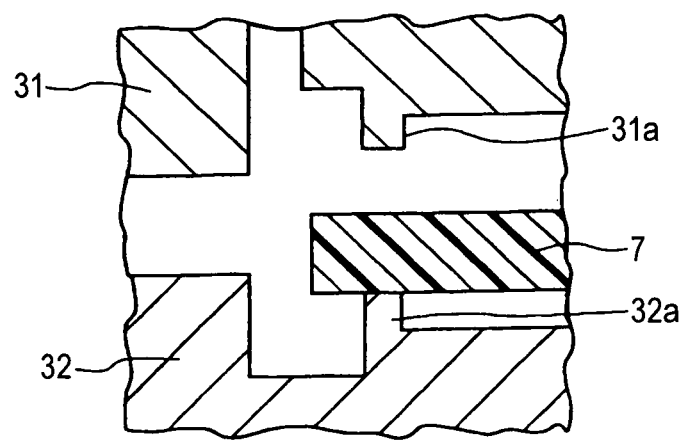
FIG. 12 is a partial sectional view describing describes a fabrication method of the intake duct according to Embodiment 1, which shows a state in which an air-permeable member is disposed in a divided body mold.

Firstly, as shown in FIG. 12, the air-permeable member 7 was disposed in a predetermined position in a divided body mold 32 which is one of two divided body molds 31, 32. Fixing portions 31a, 32a are formed on the divided body molds 31, 32, respectively. These fixing portions 31a, 32a are formed in positions which correspond to an outer edge portion of the rectangular plate-shaped air-permeable member 7 and each have a rectangular frame shape.

Figure 13:
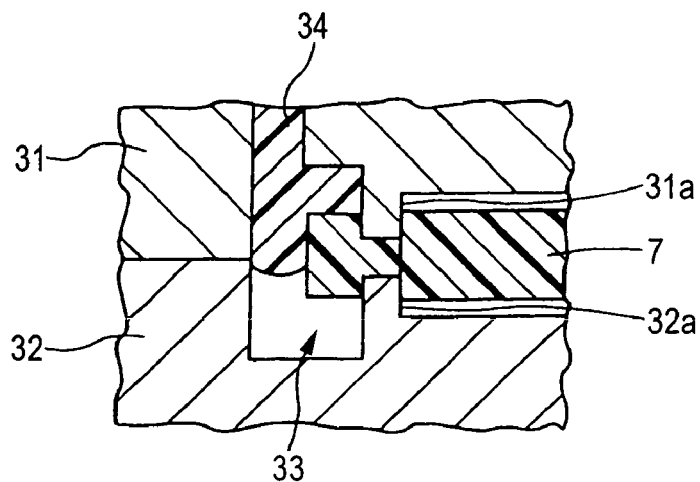
FIG. 13 is a partial sectional view describing describes a fabrication method of the intake duct according to Embodiment 1, which shows a state in which molten resin is injected into a cavity in divided body molds.

In addition, as shown in FIG. 13, the divided body molds 31, 32 were closed, whereby an inner peripheral side portion of the outer edge portion of the air-permeable member 7 is clamped to be pressurized by the fixing portions 31a, 32a. The air-permeable member 7 was fixed in the predetermined position within the molded body molds 31, 32 in this way.

Then, a molten resin 34 was injected from a screw of an injection machine, not shown, into a cavity 33 defined by the divided body molds 31, 32 in which the air-permeable member 7 is disposed. As this occurs, since the air-permeable member 7 is clamped by the fixing portions 31a, 32a, there occurs no case where the air-permeable member 7 is moved by the molten resin 34 so injected. The molten resin 34 gradually penetrates into an interior of the outer edge portion of the air-permeable member 7. As this occurs, in the outer edge portion lying in the pair of long side portions of the air-permeable member 7, the molten resin 34 penetrates into the outer edge portion from three directions; from the two sides of the outer edge portion which are oriented in the width direction and the edge surface of the outer edge portion (refer to FIG. 3) In addition, in the outer edge portion lying the pair of short side portions of the air-permeable member 7, the molten resin penetrates into the outer edge portion from two directions; from one side of the outer edge portion which is oriented in the thickness direction and the edge surface of the outer edge portion. Note that the inner peripheral side of the outer edge portion of the air-permeable member 7 is pressurized by the fixing portions 31a, 32a, and this pressurized portion is compressed and hence, the density of the outer edge portion thereat is increased. Due to this, there occurs no case where the molten resin penetrates further inwards of the air-permeable member 7 than the pressurized portion.

Thereafter, the molten resin 34 so injected was cooled for a predetermined period of time, whereby the molten resin 34 which penetrated into the outer peripheral side portion of the outer edge portion of the air-permeable member 7 was caused to set in such a state that the molten resin 34 intruded between PET fibers which make up the air-permeable member 7 so as to get entwined with the fibers in a complex fashion, so as to form the joining portion 6. Thus, the air-permeable member was joined integrally to the second divided body 2 which was then made of the resin so set by the insert molding.

On the other hand, the first divided body 1 and the first chamber wall portion 24 and the duct wall portion 27 of the resonator 8 were injection molded together, while the second chamber wall portion 26 of the resonator 8 was injection molded singly, using the injection machine, not shown.

Then, the first chamber wall portion 24 and the second wall chamber portion 26 of the resonator 8 were welded together through heat plate welding, and the first divided body 1 and the second divided body were connected together, whereby the intake duct according to this embodiment was completed.

In the intake duct according to the embodiment, since the molten resin 34 penetrates into the outer edge portion of the air-permeable member 7 from the three directions thereof in the pair of long side portions of the air-permeable member 7, while in the vicinity of the central portions of the pair of short side portions of the air-permeable member 7, the molten resin 34 penetrates into the outer edge portion of the air-permeable member 7 from the two directions thereof, the outer edge portion of the air-permeable member 7 can be impregnated with a sufficient amount of molten resin 34. Due to this, the volume of the joining portion 6 is increased, and hence, the joining force is also increased.

Namely, in this intake duct, the second divided body 2 in which the air-permeable member 7 is insert molded has in the part of the inner peripheral edge of the opening 4 (the pair of long side portions of-the opening 4) the vertical wall portions 22 which protrude outwards from the duct wall of the second divided body 2 along the inner edge of the opening 4. In addition, the part of the joining portion 6 of the air-permeable member 7 (the pair of long side portions of the air-permeable member 7) is embedded in the vertical wall 22 in such a manner as to be held therein. Due to this, the long side portions of the joining portion of the air-permeable member 7 are also connected mechanically strongly to the vertical walls 22, respectively.

Consequently, according to the intake duct, irrespective of the thickness of the second divided body 2 and the air-permeable member 7, the joining properties of the joining portion 6 can be improved, and the joining properties of the air-permeable member 7 relative to the second divided member 2 can be made highly reliable.

In addition, the second divided body 2 has in the pair of short side portions of the opening 4 the pair of covering projections 23 which extends in the transverse direction along the inner edge of the opening and covers the outer surface of the joining portion 6 in the short side portions of the air-permeable member 7. These covering projections 23 can securely prevent short side portions of the joining portion 6 of the air-permeable member 7 from being turned up.

Furthermore, in this intake duct, since the inner surface of the joining portion 6 in the short side portions of the air-permeable member 7 is made substantially level with the inner wall surface 2a of the second divided body 2, air is advantageously allowed to flow smoothly within the intake passageway 3, thereby making it possible to suppress an increase in intake pressure loss which is attributed to the provision of the air-permeable member 7.

Embodiment 2

Figure 14:
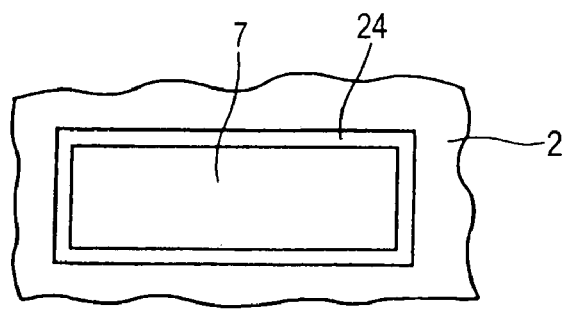
FIG. 14 is a bottom view of a main part of an intake duct according to Embodiment 2 which shows an opening and a portion where an air-permeable member is placed of the intake duct.
Figure 15:
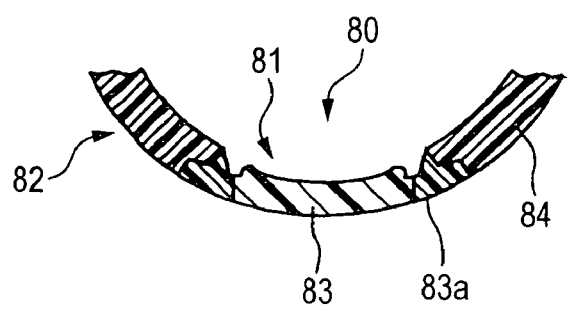
FIG. 15 is a partial sectional view showing a conventional intake duct.

In an intake duct according to this embodiment, which is shown in FIG. 14, a second divided body 2 has along the whole of an inner peripheral edge of an opening 4 (a pair of long side portions and a pair of short side portions of the opening 4) a frame-like vertical wall portion 24 which extends along an inner edge of the opening 4 and protrudes outwards from a duct wall of the second divided body 2. This frame-like vertical wall portion 24 extends substantially at right angles to a duct axis of an intake duct 5. In addition, the frame-like vertical wall portion 24 has a height which is uniform along the full periphery thereof.

In addition, a joining portion 6 lying along the whole of an outer peripheral edge of an air-permeable member 7 (a pair of long side portions and a pair of short side portions of the air-permeable member 7) is embedded in an inner peripheral surface of the frame-like vertical wall portion.

Namely, the frame-like vertical wall portion 24 has a frame-like ceiling portion, a frame-like bottom wall portion and a frame-like side wall portion which are integrated therewith in such a manner that the frame-like ceiling portion and the frame-like bottom wall portion cover both sides of the joining portion 6 lying along the whole of the outer peripheral edge of the air-permeable member 7 in such a manner as to hold the sides therebetween, the sides of the joining portion 6 so covered and held being oriented in a thickness direction thereof, while the frame-like side wall portion covers an edgewise face of the joining portion 6 lying along the whole of the outer peripheral edge of the air-permeable member 7. In addition, the frame-like ceiling portion and the frame-like bottom wall portion have a thickness which is uniform along the full periphery of the frame-like vertical wall portion 24.

Note that being different from Embodiment 1, in Embodiment 2, an inner surface of the joining portion 6 in the short side portions of the air-permeable member 7 is not made substantially level with an inner wall surface 2a of the second divided body 2.

Consequently, in this intake duct, since the joining portion 6 is embedded in the frame-like vertical wall portion 24 along the whole of the outer peripheral edge of the air-permeable member 7, the joining strength of the air-permeable member 7 relative to the second divided body 2 can be increased.

In addition, the risk that the short side portions of the joining portion 6 of the air-permeable member 7 are turned up outwards can securely controlled by the frame-like vertical wall portion 24.

Other configurations, as well as functions and advantages of this embodiment are basically similar to those of Embodiment 1.

Other Embodiments

The invention is not limited to the intake ducts that have been described heretofore, and hence, various alterations and/or modifications can be made thereto without departing from the spirit and scope of the invention.

For example, there is no limitation on the material which makes up the air-permeable member, provided that fibers or the like which make up the air-permeable member may be impregnated with a molten resin, and polypropylene, polyethylene and the like may be used.

In addition, for example, open-cell expanded materials such as polyurethane (PUR) foam can be adopted as the air-permeable member.

There is no limitation on the position and number of air-permeable members to be provided, and they may only have to be determined in consideration of intake noise reduction effect, positional relationship with other components which are installed in an engine compartment and the like.

In addition, as to the shape of the air-permeable member, in addition to the substantially rectangular shape, other shapes such as an oval shape may be adopted.

Furthermore, polyethylene (PE), polyamide (PA) and the like may be used as the thermoplastic resin which makes up the divided bodies.

In addition, while the claw fitting is used as the mechanism for connecting the divided bodies to each other, other fitting mechanisms such as a pin and a hole, a clip and a hole, and a bolt and a nut may be adopted to connect them together, or the divided bodies may be welded together.

Additionally, the number of divided bodies is not limited to two.

What is claimed is:
1. An intake duct comprising:
  a duct main body formed into a hollow tubular shape having an intake passageway in an interior thereof through which outside air is introduced into an internal combustion engine, the duct main body including a plurality of divided bodies made of a thermoplastic resin connected integrally with one another to form an opening for a communication between an inside and outside of the intake passageway in a duct wall of the divided body; and an air-permeable member which is provided by insert molding in the divided bodies so as to cover the opening and whose outer edge as a joining portion is impregnated with the thermoplastic resin, wherein the divided bodies have a vertical wall portion which protrudes outwards from a duct wall of the divided bodies along at least a part of an inner edge of the opening, and at least a part of the joining portion of the air-permeable member is embedded in the vertical wall portion so as to be held therein in a thickness direction thereof.

2. An intake duct according to claim 1, wherein the opening and the air-permeable member are each formed into a substantially rectangular shape which is elongated in a direction in which the intake passageway extends, and wherein the vertical wall portion is formed in a pair of long side portions of the opening in such a manner as to extend in a longitudinal direction, and the joining portion in a pair of long side portions of the air-permeable member is embedded in facing inner surfaces of the pair of vertical walls so formed.

3. An intake duct according to claim 1, wherein the opening and the air-permeable member are each formed into a substantially rectangular shape which is elongated in a direction in which the intake passageway extends, wherein the divided body has in a pair of short side portions of the opening a pair of covering projections which extends in a transverse direction along the inner edge of the opening and covers an outer surface of the joining portion in a pair of short side portions of the air-permeable member, and wherein an inner surface of the joining portion in the short side portions of the air-permeable member is made substantially level with an inner wall surface of the divided body.

4. An intake duct according to claim 1, wherein the vertical wall portion is a frame-like vertical wall portion which extends along the inner edge of the opening over the whole of the inner peripheral edge of the opening, and a whole circumference of the joining portion of the air-permeable member is embedded in the frame-like vertical wall portion.

5. An intake duct according to claim 1, wherein the first divided body and the second divided body are securely sealed together along an edge portions thereof by a seal portion.

6. An intake duct according to claim 5, wherein the seal portion has a labyrinth seal construction which extends longitudinally along the full length of the intake passageway.

7. An intake duct according to claim 5, wherein the seal portion is provided integrally on the first divided body in a vicinity of the edge portion thereof.

8. An intake duct according to claim 5, wherein the seal portion is made up of an L-shaped engagement portion which protrudes from an outer surface of the first divided body to form an engagement recess portion and an engagement portion provided on the edge portion of the second divided body so as to be brought into engagement with the engagement recess portion.

9. An intake duct according to claim 1, wherein said at least a part of the joining portion of the air-permeable member is embedded in the vertical wall portion so that a molten resin is, capable of penetrating into the outer edge portion of the air-permeable member from three directions.

* * * * *